E. H. FORD.
ANTIFREEZE HOOD FOR WATER METERS.
APPLICATION FILED APR. 13, 1917.
1,281,332.
Patented Oct. 15, 1918.
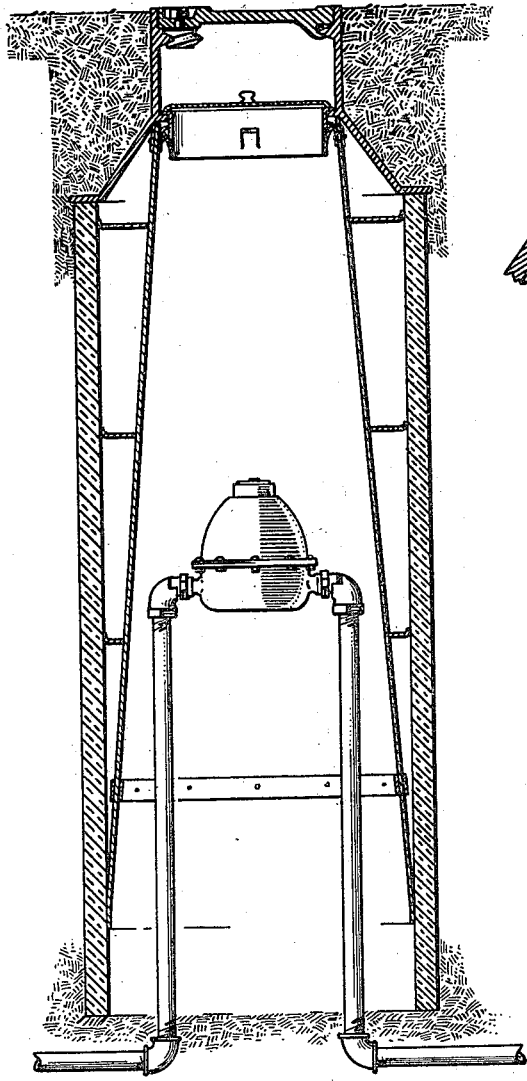
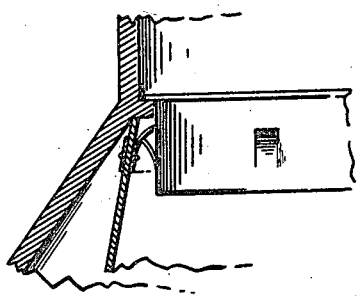
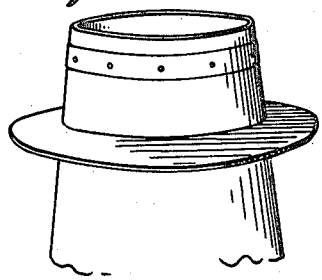
INVENTOR
Edwin H. Ford,
By Minturn & Woerner
ATTORNEYS.

UNITED STATES PATENT OFFICE.

EDWIN H. FORD, OF WABASH, INDIANA.

ANTIFREEZE-HOOD FOR WATER-METERS.

1,281,332.  Specification of Letters Patent.  Patented Oct. 15, 1918.

Application filed April 13, 1917. Serial No. 161,773.

*To all whom it may concern:*

Be it known that I, EDWIN H. FORD, a citizen of the United States, residing at Wabash, in the county of Wabash and State of Indiana, have invented certain new and useful Improvements in Antifreeze-Hoods for Water-Meters, of which the following is a specification.

Many water companies have had the experience of water meters freezing in one portion of a city while meters located in another portion of the same city were free from such freezing. A comparison of observations taken by different water companies where the above conditions have arisen has resulted in one common finding, namely, that the frozen meters were found in meter-boxes which were located in sandy soil, whereas meters in boxes which were located in clay and similar soils were immune from freezing. The consensus of the opinions relating to the above matter is that sandy soil allows heat to be radiated more rapidly from the meter-box than clay or similar soils.

The present invention relates to certain means for covering water meters arranged in meter-boxes; and one of the objects of the invention consists in the provision of means by which water meters are protected so as to reduce their liability against freezing, by preventing too rapid radiation of heat from the meter-box and thereby maintaining a constant temperature within the meter-box above the freezing point.

A further object of the invention consists in the provision of means, by which freezing of water meters is prevented, which is simple in construction, easy of installation, and economical to manufacture.

I accomplish the above objects of the invention by means of the construction illustrated in the accompanying drawings, forming a part hereof, in which—

Figure 1 is a central vertical sectional view through a meter-box, showing my invention in operative position. Fig. 2 is a fragmentary detail sectional view, on an enlarged scale, showing more clearly the means for securing my invention within a meter-box. Fig. 3 is a fragmentary detail perspective view of the upper end of the hood. Fig. 4 is a fragmentary detail horizontal sectional view showing a modified form of hood construction.

Referring to the drawings, 10 represents the meter-box; 11 a throat-piece for reducing the size of the inlet leading into the box 10, and 12 the cover or lid.

15 represents the water service pipe which extends vertically into box 10 in the form of two pipe-branches 16, and suitably supported by and arranged between the free ends of said pipe-branches is a water measuring meter 19.

The hood for maintaining a more uniform temperature around meter 19, and which forms the subject-matter of the present case, comprises a hollow truncated cone 25 which is preferably formed of suitable paper of sufficient thickness to add rigidity, the paper being treated so as to be impervious to moisture. The lower end of cone 25 is of a diameter to tightly impinge the inner wall of the meter-box, thereby cutting off communication between the lower interior of box 10 with the upper portion extending around the outer surface of the cone. By this construction a wedge shaped chamber 26 is formed from approximately the upper to the lower end of the cone, which chamber provides a dead air space and forms an insulation for preventing too rapid radiation of heat from the meter-box 10.

To add additional rigidity and assist in conserving the symmetry of cone 25 the latter near its lower end is provided with the hoops 27. The upper end of cone 25 is provided on its outer surface with a hoop 28, and upon its inner surface is a hoop 29 having its upper edge curved inwardly as at 30, in Figs. 1 and 2. Inserted into the upper end of cone 25 is a collar 32 having an outwardly disposed annular extending flange 33 which rests upon and is supported by an annular rib 34 formed on the internal wall of throat-piece 11. At intervals around the wall of collar 32 a tongue 35 is cut and bent outwardly, the outer free ends of these tongues are adapted to catch under the inwardly curved edge of hoop 29 and serve to hold the upper end of cone 25 securely in operative position. The upper end of cone 25 is closed by means of a lid 36, and in placing cover 12 into position a dead air chamber 37 is formed between the lid and cover.

It has been found in practice that meters protected by hoods as herein shown and described will protect the water therein against freezing, whereas the water was found frozen in the meters not protected by the hoods.

In latitudes where moderate weather conditions prevail, it has been found sufficient to extend cone 25 but slightly below the lower edge of meter 19, but in the higher latitudes where cold weather conditions prevail I prefer to employ cones of a length to extend to the bottom, or approximately so, of the box 10.

I have also found it practical and expedient in exceptionally severe climates to divide dead air chamber 26 into separate zones, and this I accomplish by means of a series of annular rings 40 which are composed of material similar to that forming the cone 25. Rings 40 will reduce the liability of artificially induced air current which might arise in a large chamber through the action of heat and cold. In moderate climates I prefer to dispense with the rings 40.

Fig. 4 illustrates the possibility of utilizing corrugated shipping-board 42 properly treated to resist moisture, in which the intervening air spaces 43 between the corrugations will additionally increase the quality of insulation for the protection of meter 19.

Having thus fully described my said invention, what I desire to secure by Letters Patent, is—

1. In combination, a meter-box comprising a hollow cylinder, a meter arranged within said cylinder, and a substantially conical member arranged within the cylinder and around said meter, the lower end of the conical member impinging the inner wall of the cylinder.

2. In combination, a meter-box comprising a hollow cylinder, a meter arranged within said cylinder, a substantially conical member arranged within the cylinder around said meter, a lid for closing the upper end of the conical member, supporting means carried by the conical member, and means carried by the lid for engaging the supporting means on the conical member for supporting the latter in operative position.

3. In combination, a meter-box comprising a hollow cylinder, a meter arranged within said cylinder, a substantially conical member arranged within the cylinder and around said meter, the lower edge of said conical member impinging the inner wall of the cylinder, and means extending substantially horizontal between the outer surface of the conical member and the inner wall of the cylinder for dividing the intervening space between said conical member and cylinder.

In witness whereof, I, have hereunto set my hand and seal at Wabash, Indiana, this 3rd day of April, A. D. one thousand nine hundred and seventeen.

EDWIN H. FORD. [L. S.]

Copies of this patent may be obtained for five cents each, by addressing the "Commissioner of Patents, Washington, D. C."